United States Patent
Engl et al.

(10) Patent No.: US 8,348,676 B2
(45) Date of Patent: Jan. 8, 2013

(54) LIGHT CURTAIN ASSEMBLY

(75) Inventors: Rudolf Engl, Ampfing (DE); Helmut Pall, Ach (AT); Reinhard Schwarz, Eggelsberg (AT)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1969 days.

(21) Appl. No.: 10/677,128

(22) Filed: Sep. 30, 2003

(65) Prior Publication Data

US 2005/0069855 A1    Mar. 31, 2005

(51) Int. Cl.
*G09B 25/00* (2006.01)

(52) U.S. Cl. .......... 434/365; 434/379; 700/83; 700/180; 340/540

(58) Field of Classification Search .......... 700/83, 700/180; 434/365, 379; 340/540
See application file for complete search history.

(56) References Cited

U.S. PATENT DOCUMENTS

| | | | |
|---|---|---|---|
| 3,774,039 A | 11/1973 | Price | 350/552 |
| 3,967,111 A | 6/1976 | Brown | 250/206 |
| 3,996,476 A | 12/1976 | Lazzara | 250/563 |
| 4,007,387 A | 2/1977 | Rustecki | 310/42 |
| 4,101,784 A | 7/1978 | Key et al. | 250/555 |
| D255,031 S | 5/1980 | Lazzara | D13/165 |
| 5,015,840 A | 5/1991 | Blau | 250/221 |
| 6,243,006 B1* | 6/2001 | Rejc et al. | 340/436 |
| 2006/0075867 A1* | 4/2006 | Etter et al. | 83/522.11 |

OTHER PUBLICATIONS

"MiniSafe MS4600 Series Safety Light Curtain", *MiniSafe MS4600 Installation and Operating Manual*, (Jul. 8, 1999),1-39.

* cited by examiner

*Primary Examiner* — Tejal Gami
(74) *Attorney, Agent, or Firm* — Viksnins Harris & Padys PLLP; William Walbrun

(57) ABSTRACT

A method includes opening an access member of a sensing assembly to access programming features of the sensing assembly. Operating instructions for the sensing assembly are selected, and then a teaching actuator is actuated. The method further includes indicating the teaching actuator has been actuated, such as by visually indicating with an LED, and ceasing the indication. The method further includes implementing the operating instructions if the teaching actuator is released within a predetermined time period from cessation of the indication.

12 Claims, 4 Drawing Sheets

LIGHT CURTAIN ASSEMBLY

TECHNICAL FIELD

The present application relates to sensing assemblies. More particularly, the present application relates to a method for programming sensing assemblies and access port.

TECHNICAL BACKGROUND

Factory settings often include machinery which present a risk of personal injury. Sensing equipment, such as electro-sensitive protective equipment, for example a light curtain assembly, is used to provide a safety feature to potentially dangerous industrial equipment. The sensing equipment is programmable to cause the machinery to revert to a safe condition before a person can be placed in a hazardous situation. However, if the sensing equipment is perceived by some individuals as an inconvenience or a drag on productivity, these individuals may be motivated to modify or deactivate the sensing equipment.

Accordingly, what is needed is a way to limit access to controls for sensing equipment used in preventing persons from being placed in hazardous situations.

SUMMARY

A method and apparatus are described herein. The method includes opening an access member of a sensing assembly to access programming features of the sensing assembly. Operating instructions for the sensing assembly are selected, and then a teaching actuator is actuated. The method further includes indicating the teaching actuator has been actuated, such as by visually indicating with an LED, and ceasing the indication. The method further includes implementing the operating instructions if the teaching actuator is released within a predetermined time period from cessation of the indication.

The apparatus includes an access door, in one option, disposed on a front face of a housing assembly. The access door covers programming features, such as dip switches, and a teaching actuator. Indicators, such as LEDs are associated with the housing and provide, in one option, indication that the access door has been opened. In another option, the indicators indicate whether the teaching actuator has been actuated. In yet another option, the access door includes a fastener that prevents unauthorized access through the access door.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
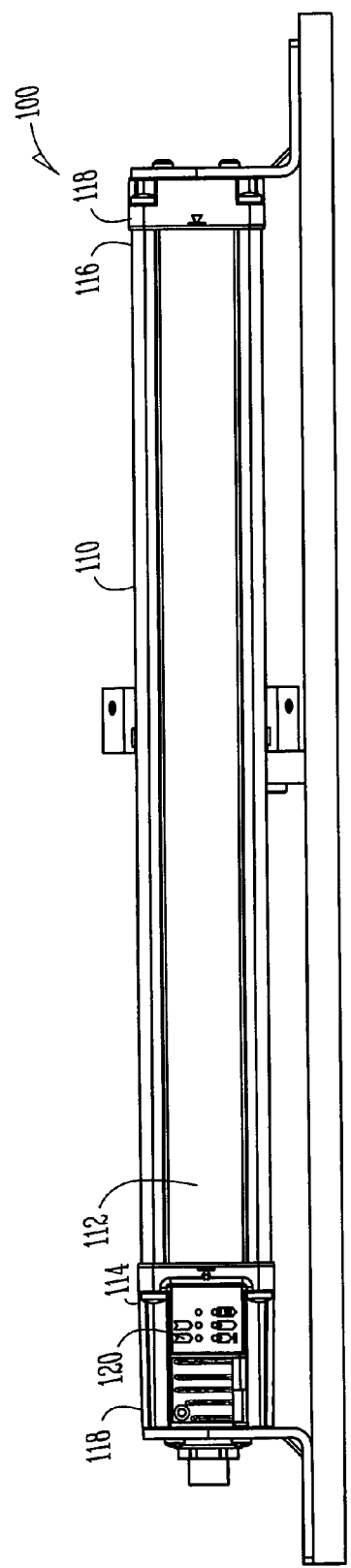
FIG. 1 illustrates a front elevational view of a sensing assembly as constructed in accordance with one embodiment.

The present application relates to sensing assemblies and programming such assemblies. One example of a sensing assembly 100 is illustrated in FIG. 1, which illustrates a photoelectric protective device. One example of use of the sensing assembly 100 is one or more light curtains for personnel protection in point of operation machine, guarding applications, as well as perimeter and access control applications.

With respect to sensing assembly 100, this includes, but is not limited to, a component that transmits and/or senses a signal or light. The sensing assembly 100 can be solely a transmitter, for example, of light from a series of LEDs. Alternatively, the sensing assembly 100 is a receiver that senses a signal, light, or equivalent from a transmitter. In yet another option, the sensing assembly 100 can include therein both a transmitter and a receiver. The sensing assembly 100, or multiple sensing assemblies, are controlled and/or monitored such that disruption of the signal which is transmitted by the transmitter such that it is not received nor sensed by the receiver results in a change to the output signal that, for example, indicates the presence of an object, or in another example, disables operation of hazardous machinery.

The sensing assembly 100 includes at least one housing assembly, including at least one housing 110. The housing 110 at least partially encompasses the sensing and/or transmitting circuitry and components. The housing 110 includes a first surface 112, and extends from a first end 114 to a second end 116. In one option, the first surface 112 is a surface through which light is transmitted and/or received. In one option, the housing 110 is an elongate structure formed of a substantially rigid material, such as aluminum. The housing 110, in one option, is extruded. The housing assembly further includes one or more end caps 118 coupled at the first and second ends 114, 116 of the housing 110. Coupled with or disposed adjacent to the housing 110, for example, on or within the end cap 118 is a control/display assembly 120.

The control/display assembly 120 allows for the monitoring and control of the sensing assembly 100. For example, the control/display assembly 120 indicates the status of the sensing assembly 100, such as the current mode of operation, or whether a fault has occurred, whether the sensing assembly 100 is powered up, whether the presence sensing features, if any, have detected the presence of a device. In another example, the control/display assembly 120 allows for the mode of operation to be set or modified.

Figure 2:
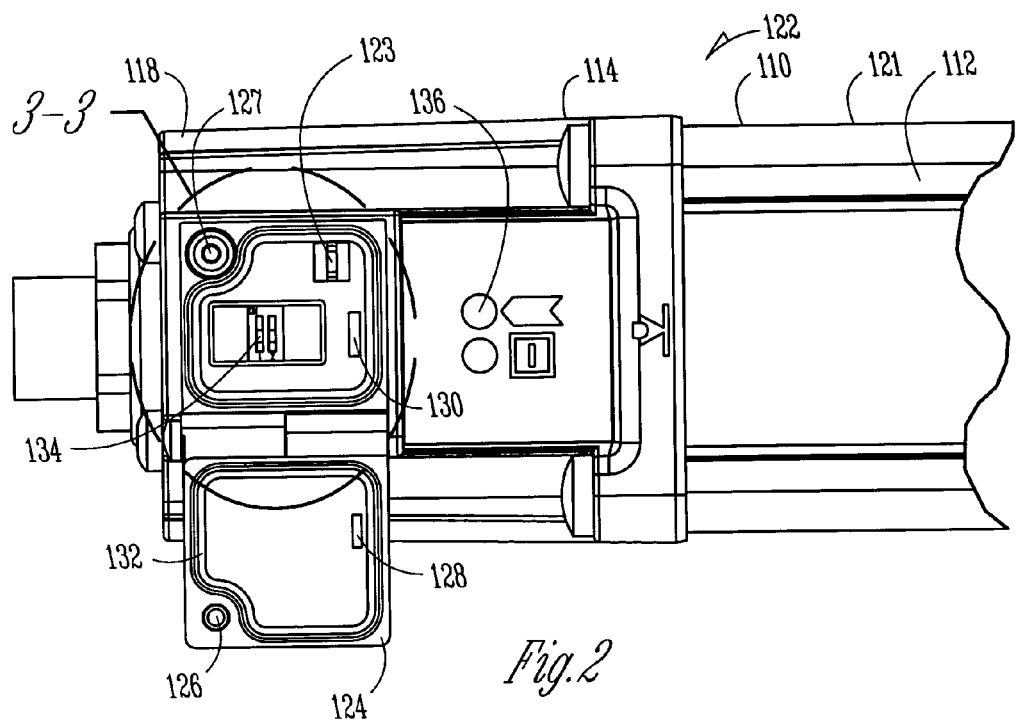
FIG. 2 illustrates a portion of a transmitting sensing assembly as constructed in accordance with one embodiment.
Figure 3:
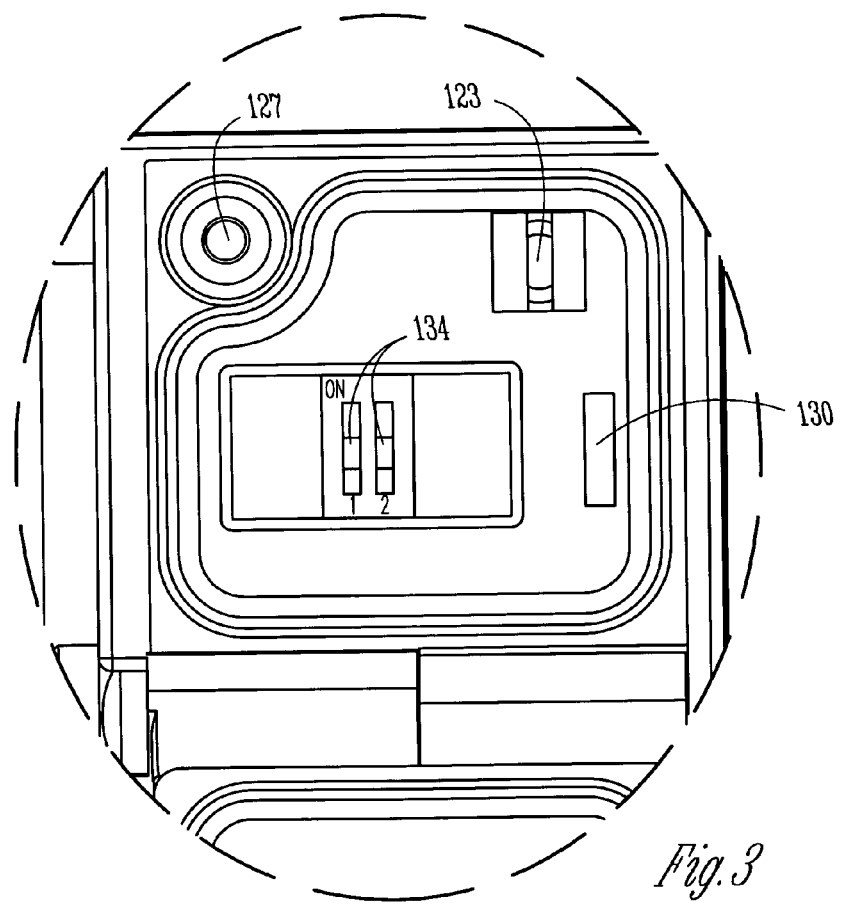
FIG. 3 illustrates a portion of a transmitting sensing assembly as constructed in accordance with one embodiment.

One example of a control/display assembly 120 is a control/display assembly 122 for a transmitter, i.e. a device that transmits a signal to another device, as illustrated in FIGS. 2 and 3. The control/display assembly 122 includes visual indicators, programming features, such as dip switches, and at least one optional teach actuator 123, further discussed below. The control/display assembly 122 further includes an access door 124 which allows and prevents access to the control components of the control/display assembly 122. The access door 124 is optionally disposed on a surface of the housing 110, such as the first surface 112, or alternatively end cap 118, and includes an open position and a closed position.

To open the access door 124, the door 124 is optionally slid, rotated, elevated, or otherwise modified in position or condition to provide access to componentry otherwise protected by the access door 124. In one option, the access door 124 includes a fastener 126 that prevents the access door 124 from being opened. In another option, the fastener 126 prevents the access door from being opened by unauthorized individuals. For example, the fastener 126, in one option, is a specialized, non-conventionally shaped fastener that requires use of a specialized tool to remove the fastener. The fastener 126, in one option, is received through the door 124 by a recess 127. Alternatively, other ways of preventing unauthorized access or opening of the door 124 are contemplated herein. For example, a key, keyless remote, programmable keypad, combination locking systems, and the like are further contemplated within the scope of the application. In one option, the access door 124 must be in a closed position for the transmitter to operate.

As discussed above, the access door 124 is coupled to a portion of the housing 110 or end cap 118. Disposed on or within the member to which the access door 124 is coupled, is a sensor that senses whether the access door 124 is in a closed position or an access position. In one example, the sensor includes a projection 128 disposed on the access door 124 that mates within a recess 130 of the member, such as the end cap 118. Disposed within the recess 130, or adjacent to the recess 130 is a pressure sensitive device that monitors whether the projection 128 of the access door 124 is pressing against it. It should be noted that other manners in which to monitor the disposition of the access door 124 would be suitable as well. The access door 124 prevents unauthorized access to components protected by the access door 124, while still allowing for easy access for authorized individuals.

The access door 124 optionally further includes one or more sealing features 132. The sealing features 132, in one option, is a rubber gasket disposed between the access door 124 and the component to which the access door 124 is mounted, such as the end cap 118. When the access door 124 is disposed in a closed position, the sealing features 132 allow for the access door 124 to be sealingly engaged with a portion of the sensing assembly 100, such as the end cap 118 or the housing 110. The sealing features 132 prevent entry of fluids, gases and the like.

The access door 124 prevents harmful environmental factors from entering or coming in contact with components protected by the access door 124. The access door 124 further prevents unauthorized access to the programming components such as one or more dip switches 134. The dip switches 134 include one or more positions, such as a first position and a second position, and allow for the component, such as the transmitter to be programmed to operate in a certain mode. To set the mode of operation, the dip switches 134 are placed in a predetermined configuration. Optionally, this can be done by a remote control.

The control/display assembly 122 further includes at least one visual indicator 136. The at least one visual indicator 136, in one option, includes one or more LEDs. In one option, the visual indicator 136 indicates whether or not power is provided to the transmitter 121. The visual indicators further aid in the programming of the transmitter, as further described below. It should be noted that other types of indicators can be used with the transmitter as well, such as audible or tactile indicators.

The control/display assembly 122, in one option, includes at least one teach actuator 123, such as a button. The at least one teach actuator 123 is used in conjunction with the visual indicators to implement the programming of the dip switches 134. In another option, the at least one teach actuator 123 is used to teach component location, for example, for a fixed blanking mode of operation. Once the dip switches 134 are disposed in a selected configuration, the teach actuator 123 is actuated, such as by depressing a button, for a predetermined amount of time. When the teach actuator 123 is actuated, at least one of the visual indicators 136 begins to indicate that the teach actuator 123 is actuated, for example by flashing or blinking. The visual indicator 136 will cease indicating while the teach actuator 123 is still actuated, and the user must release the teach actuator 123 within a predetermined amount of time to implement the programming of the dip switches 134. In one option, the user must release the teach actuator 123 within 2-4 seconds from when the LED stops flashing or blinking. In another option, the visual indicators 136 provide confirmation that the programming was effectively entered, for example by blinking or flashing a predetermined number of times after the teach actuator 123 is released.

Figure 4:
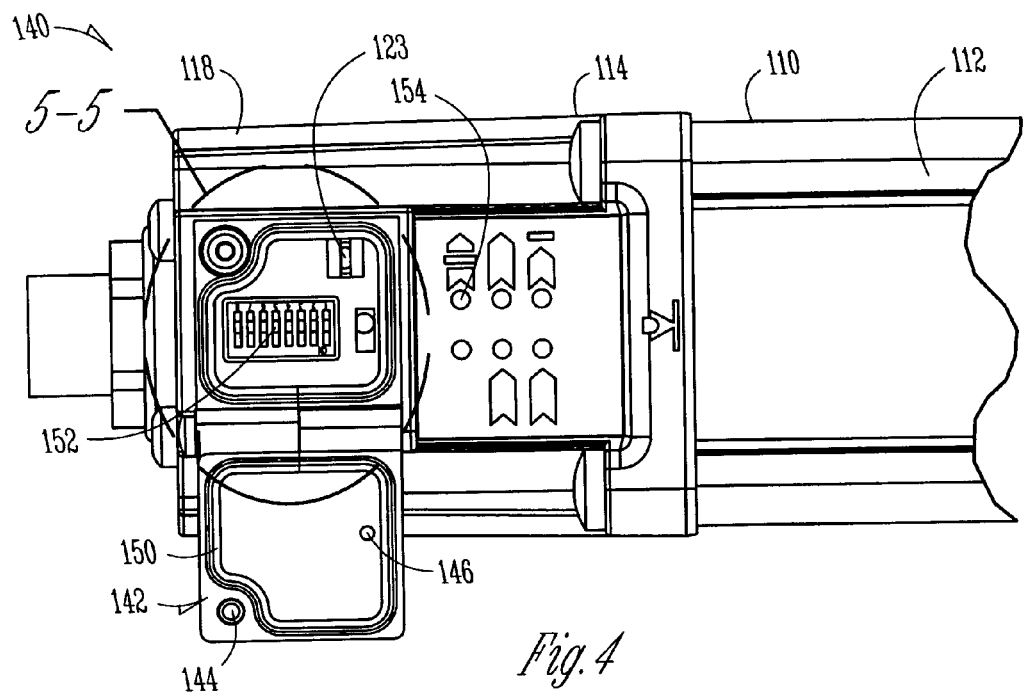
FIG. 4 illustrates a portion of a receiving sensing assembly as constructed in accordance with one embodiment.
Figure 5:
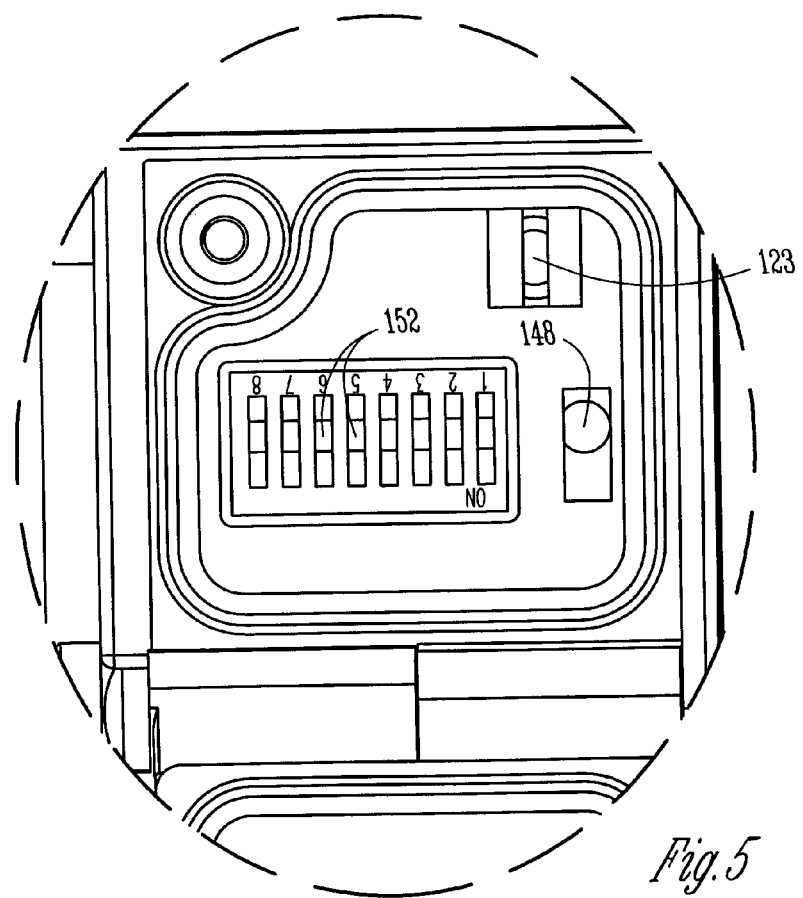
FIG. 5 illustrates a portion of a receiving sensing assembly as constructed in accordance with one embodiment.

Another example of a control/display assembly 120 is a control/display assembly 140 for a receiver, i.e. a device that receives a signal from another device, as illustrated in FIGS. 4 and 5. The control/display assembly 140 includes an access door 142 which allows and prevents access to the control components of the control/display assembly 140. The access door 142 is optionally disposed on a surface of the housing 110, such as the first surface 112, or alternatively end cap 118.

To open the access door 142, the door 142 is optionally slid, rotated, elevated, or otherwise modified in position or condition to provide access to componentry otherwise protected by the access door 142. In one option, the access door 142 includes a fastener that prevents the access door 142 from being opened. In another option, the fastener 144 prevents the access door from being opened by unauthorized individuals. For example, the fastener 144, in one option, is a specialized, non-conventionally shaped fastener that requires use of a specialized tool to remove the fastener. Alternatively, other ways of preventing unauthorized access or opening of the door 142 are contemplated herein. For example, a key, keyless remote, programmable keypad, combination locking systems, and the like are further contemplated within the scope of the application.

As discussed above, the access door 142 is coupled to a portion of the housing 110 or end cap 118. Disposed on or within the member to which the access door 142 is coupled is a sensor that senses whether the access door 142 is in a closed position or an access position. In one example, the sensor includes a projection 146 disposed on the access door 142 that mates within a recess 148 of the member, such as the end cap 118. Disposed within the recess 148, or adjacent to the recess 148 is a pressure sensitive device that monitors whether the projection 146 of the access door 142 is pressing against it. It should be noted that other manners in which to monitor the disposition of the access door 142 would be suitable as well.

The access door 142 optionally further includes one or more sealing features 150. The sealing features 150, in one option, is a rubber gasket disposed between the access door 142 and the component to which the access door 142 is mounted, such as the end cap 118. When the access door 142 is disposed in a closed position, the sealing features 132 allow for the access door 142 to be sealingly engaged with a portion of the sensing assembly 100, such as the end cap 118 or the housing 110. The sealing features 150 prevent entry of fluids, gases and the like.

The access door 142 prevents harmful environmental factors from entering or coming in contact with components protected by the access door 142. The access door 142 further prevents access to components such as one or more dip switches 152. The dip switches 152 include one or more positions, such as a first position and a second position, and allow for the component, such as the receiver to be programmed to operate in a certain mode, such as floating blanking or fixed blanking. In one option, there are eight dip switches 152.

The receiver further includes at least one visual indicator 154. The at least one visual indicator 154, in one option, includes one or more LEDs. In one option, the visual indicator 154 indicates whether or not power is provided to the receiver. The visual indicator 154, in another option, indicates when the access door 142 is in an opened position, or that access to the programming features such as the dip switches has been obtained. In another option, the visual indicator assists in implementing the programming of the dip switches 152, as further described below.

The control/display assembly 140, in one option, includes at least one teach actuator 123, such as a button. Other teach actuators can be used as well, including mechanical and electrical switches, thermal sensors, light or pressure or sound activated switches or sensors. The at least one teach actuator 123 is used in conjunction with the visual indicators to implement the programming of the dip switches 152. Once the dip switches 152 are disposed in a selected configuration, the teach actuator 123 is actuated, such as by depressing a button, for a predetermined amount of time. When the teach actuator 123 is actuated, at least one of the visual indicators 154 begins to indicate that the teach actuator 123 is actuated, for example by flashing or blinking. In one option, the visual indicators 154 flash at a rate different than the rate of flashing that optionally occurs when the access door is opened.

The visual indicator 154 will cease indicating while the teach actuator 123 is still actuated, and the user must release the teach actuator 123 within a predetermined amount of time to implement the programming of the dip switches 152. In one option, the user must release the teach actuator 123 within two seconds from when the LED stops flashing or blinking in order to effectively implement the programming of the dip switches 152. In another option, the visual indicators 154 provide confirmation that the programming was effectively entered, for example by blinking or flashing a predetermined number of times after the teach actuator 123 is released.

Figure 6:
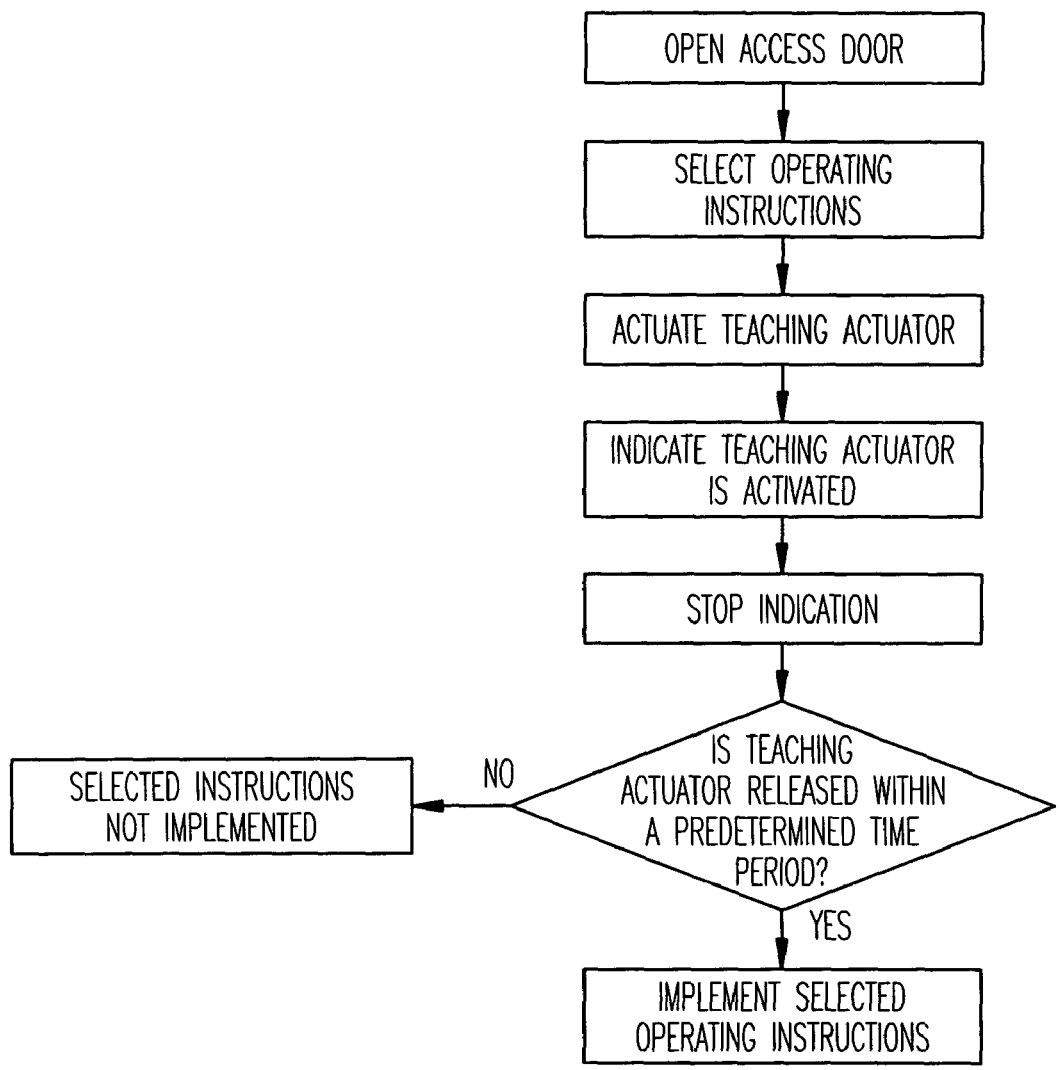
FIG. 6 illustrates a flow chart in accordance with one embodiment.

During use of the system, when the parameters of the operation mode are to be initiated, modified, or confirmed, the following steps occur, and as illustrated in FIG. 6. An operator opens the access member, such as the access door discussed above. This allows access to features that allow for selection of operating instructions, such as dip switches, as discussed above. In one option, a special access tool or code is used to open the access door to prevent unauthorized access to the programming features of the sensor assemblies. In one option, a customized tool, or a tool that is not readily commercially available, is used to open the fastener of the access door. In one example, the access tool has a unique cross-section that mates with a corresponding cross-section of the fastener.

When the access door is opened, in one option, there is a visual indication, for example by one or more LEDs, that the access door has been opened. In one option, when the access door of the receiver is opened, an LED of a first color blinks, for examples, a red LED. In another option, the LED blinks at a predetermine rate when the access door is opened. When the access door of the transmitter is opened, in one option, an LED of a second color, for example, amber, begins flashing or blinking.

After the access door for the transmitter and/or receiver has been opened, the device can be programmed using the dip switches. In one example, the dip switches are moved to the appropriate configurations to select a desired operation mode.

Once the operation mode is selected, the operation mode is implemented by use of a teaching actuator 123. The teaching actuator 123 is pressed for a predetermined amount of time, and a visual indicator indicates that the teaching button 123 has been actuated. In one option, the visual indicator flashes at a predetermined rate for a predetermined amount of time. In one option, a yellow LED flashes at 10 Hz. The visual indicator ceases from visual indicating, for example it ceases flashing, after, for example, a predetermined amount of time. To implement the programmed instructions, the teach button is released within a predetermined amount of time lapse from when the cessation of the visual indication, for example, the teaching actuator is released 2-4 seconds after the LED stops flashing. If this sequence is followed, the programming of the dip switches is implemented. In another option, the programming of the dip switches is implemented only if the sequence is followed, and the access door is placed and further optionally sensed in a closed position. In yet another option, the programming of the dip switches is implemented only if the sequence is followed, the access door is placed and sensed in a closed position, and the access door is locked and optionally sensed in a locked configuration, where the access door is locked to unauthorized individuals.

The sequence of programming, in addition to the accessability of the access door provides an effective manner in which to allow authorized individuals to program the devices, while preventing unauthorized access to the programming of the sensing assemblies. In another option, confirmation of the programming is provided by the visual indicator. For example, if the programming of the device was implemented by the user following the proper sequence of steps with the teaching actuator 123, the visual indicator provides a confirming visual indication, such as by flashing a predetermined number of times.

Advantageously, the above-described embodiments provide an effective way of preventing access to programming controls by unauthorized individuals, while providing efficient access to individuals authorized to modify the settings of the sensors. Still further, the sequence of steps further prevents unauthorized programming of the programming features.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate the invention and does not pose a limitation on the scope of the invention unless otherwise claimed. No language in the specification should be construed as indicating any non-claimed element as essential to the practice of the invention.

It is to be understood that the above description is intended to be illustrative and not restrictive. Many other embodiments will be apparent to those of skill in the art upon reading and understanding the above description. It should be noted that embodiments discussed in different portions of the description or referred to in different drawings can be combined to form additional embodiments of the present invention. The scope of the invention should, therefore, be determined with reference to the appended claims along with the full scope of equivalents to which such claims are entitled.

What is claimed is:

1. An apparatus comprising:
A light curtain assembly, the light curtain assembly including:
- a housing assembly; programmable controls coupled with the housing assembly;
- a teaching actuator operatively coupled with the programmable controls;
- an access door coupled with a portion of the housing assembly, the access door having a closed position and an open position, the access door preventing access to the programmable controls and the teaching actuator through the access port when the access door is disposed in the closed position, the access door structured as slidable, as rotatable, as operably elevated, or combinations thereof to provide access to the programmable controls otherwise protected by the access door;
- one or more visual indicators, wherein the teaching actuator is released in a predetermined amount of time after a change in visual indication of the visual indicators, and programming of the programmable controls is implemented; and
- a sensor configured to sense whether the access member door is in the closed position or in the open an access position.

2. The apparatus as recited in claim 1, further comprising a fastener coupled with the access door, wherein the fastener prevents unauthorized access to the programmable controls.

3. The apparatus as recited in claim 1, wherein the access door is disposed on a transmitting side of the housing assembly.

4. The apparatus as recited in claim 1, wherein the programmable controls comprise dip switches.

5. The apparatus as recited in claim 1, further comprising one or more sealing features between the access member door and the housing assembly.

6. The apparatus as recited in claim 1, wherein the one or more visual indicators indicate when the teaching actuator is actuated.

7. An apparatus comprising:
a light curtain assembly, the light curtain assembly including:
- a housing assembly including an access port therein;
- programmable controls coupled with the housing assembly;
- a teaching actuator operatively coupled with the programmable controls;
- an access member door coupled with a portion of the housing assembly, the access member door preventing physical access to the programmable controls through the access port and the teaching actuator when the access member door is disposed in a closed position, and the access member door structured to prevent prevents unauthorized physical access to the programmable controls, the access door operable in position or condition to provide access to the programmable controls otherwise protected by the access door;
- one or more visual indicators, wherein the teaching actuator is released in a predetermined amount of time after a change in visual indication of the visual indicators, and programming of the programmable controls is implemented; and
- a sensor configured to sense whether the access member door is in the closed position or in the open an access position.

8. The apparatus as recited in claim 7, further comprising a means for preventing unauthorized programming of the programmable controls.

9. The apparatus as recited in claim 7, further comprising dip switches.

10. The apparatus as recited in claim 7, further comprising one or more sealing features between the access member door and the housing assembly.

11. The apparatus as recited in claim 7, further comprising a fastener that prevents the access member door from being opened.

12. The apparatus as recited in claim 7, wherein the one or more visual indicators indicate when the teaching actuator is actuated.

* * * * *